US011729467B2

(12) United States Patent
Mao et al.

(10) Patent No.: US 11,729,467 B2
(45) Date of Patent: *Aug. 15, 2023

(54) FAILOVER WITH REDUNDANT MULTICASTS FOR SWITCHED DIGITAL VIDEO

(71) Applicant: Comcast Cable Communications, LLC, Philadelphia, PA (US)

(72) Inventors: Weidong Mao, West Windsor, NJ (US); Phillip Gabler, Doylestown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,010

(22) Filed: Aug. 5, 2022

(65) Prior Publication Data
US 2022/0400314 A1 Dec. 15, 2022

Related U.S. Application Data

(63) Continuation of application No. 16/923,628, filed on Jul. 8, 2020, now Pat. No. 11,445,253, which is a (Continued)

(51) Int. Cl.
*H04N 21/462* (2011.01)
*H04L 45/00* (2022.01)
(Continued)

(52) U.S. Cl.
CPC ......... *H04N 21/4622* (2013.01); *H04L 45/22* (2013.01); *H04L 45/24* (2013.01); *H04L 45/302* (2013.01); *H04L 65/611* (2022.05); *H04N 21/44209* (2013.01); *H04N 21/6118* (2013.01); *H04N 21/6405* (2013.01); *H04N 21/6581* (2013.01)

(58) Field of Classification Search
None
See application file for complete search history.

(56) References Cited

U.S. PATENT DOCUMENTS 6,973,081 B1 12/2005 Patel
7,246,367 B2 7/2007 Iivonen
(Continued)

OTHER PUBLICATIONS

Luis Rovira et al., An Open Architecture for Switched Digital Services in HFC Networks, Scientific Atlanta, a Cisco Company, White Paper G1596A, presented Jan. 12, 2006 at SCTE 2006 Cognerence on Emerging Technologies, 23 pages.
(Continued)

*Primary Examiner* — Cai Y Chen
(74) *Attorney, Agent, or Firm* — Banner & Witcoff, Ltd.

(57) ABSTRACT

A method and system for delivering content is provided. In one example, responsive to a request by a client device identifying a video program, the system is configured to determine different first and second network paths for delivery of the video program from a content source; deliver the video program via the first network path to the client device; and responsive to a change in status of the video program being delivered via the first network path, deliver the video program via the second network path to the client device.

50 Claims, 7 Drawing Sheets

Related U.S. Application Data continuation of application No. 14/809,860, filed on Jul. 27, 2015, now Pat. No. 10,757,478, which is a continuation of application No. 12/614,058, filed on Nov. 6, 2009, now Pat. No. 9,124,523.

(51) Int. Cl.
    *H04N 21/442* (2011.01)
    *H04N 21/61* (2011.01)
    *H04N 21/6405* (2011.01)
    *H04N 21/658* (2011.01)
    *H04L 65/611* (2022.01)
    *H04L 45/302* (2022.01)
    *H04L 45/24* (2022.01)

(56) References Cited

U.S. PATENT DOCUMENTS

| | | |
|---|---|---|
| 9,124,523 B2 | 9/2015 | Mao et al. |
| 2003/0118014 A1 | 6/2003 | Iyer et al. |
| 2003/0121047 A1 | 6/2003 | Watson et al. |
| 2003/0126595 A1 | 7/2003 | Sie et al. |
| 2003/0142670 A1 | 7/2003 | Gould et al. |
| 2003/0163697 A1 | 8/2003 | Pabla et al. |
| 2006/0015910 A1 | 1/2006 | Onomatsu et al. |
| 2006/0123456 A1* | 6/2006 | Dei .................. H04N 21/23476 348/E7.054 |
| 2007/0186264 A1* | 8/2007 | Briggs ................ H04L 61/5014 348/E7.071 |
| 2008/0086743 A1 | 4/2008 | Cheng et al. |
| 2009/0034633 A1 | 2/2009 | Rodirguez et al. |
| 2009/0106803 A1 | 4/2009 | Chen et al. |
| 2009/0147786 A1 | 6/2009 | Li et al. |
| 2010/0223392 A1 | 9/2010 | Pond et al. |
| 2011/0209025 A1 | 8/2011 | Takahashi |

OTHER PUBLICATIONS

Solutions Paper: Implementing Switched Digital Video Solutions, © Motorola, Inc. 2008, 11 pages.
Canadian Office Action—CA Appl. 2,684,824—dated Dec. 18, 2015.
Canadian Office Action—CA Appl. 2,684,824—dated Nov. 29, 2016.
Feb. 20, 2019—Canadian Office Action—CA 3,003,209.
Mar. 10, 2020—Canadian Office Action—CA 3,003,209.
May 20, 2021—Canadian Office Action—CA 3,003,209.
Aug. 20, 2021—Canadian Office Action—CA 3,003,209.
Aug. 15, 2022—CA Office Action—CA App. No. 3,003,209.

* cited by examiner

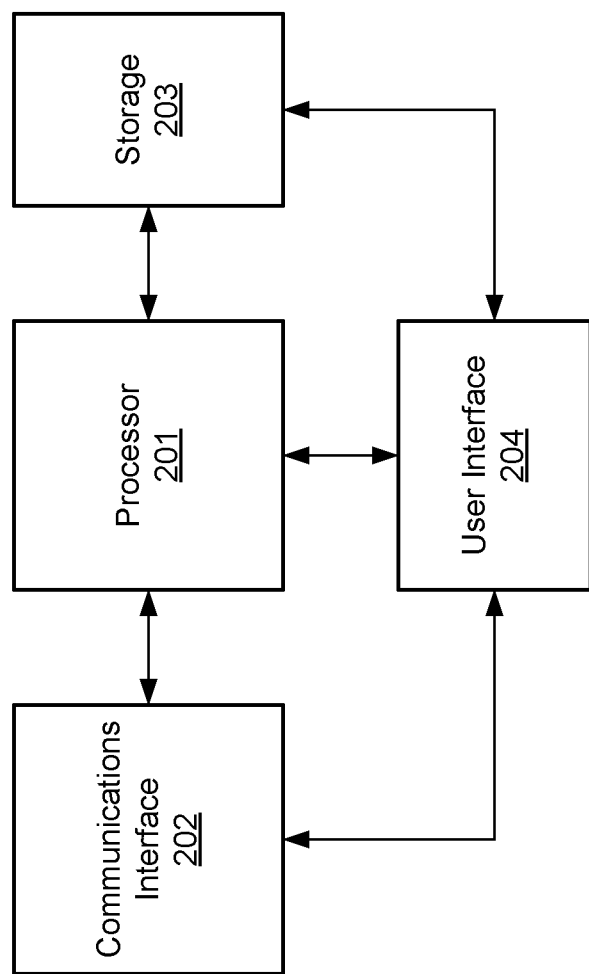

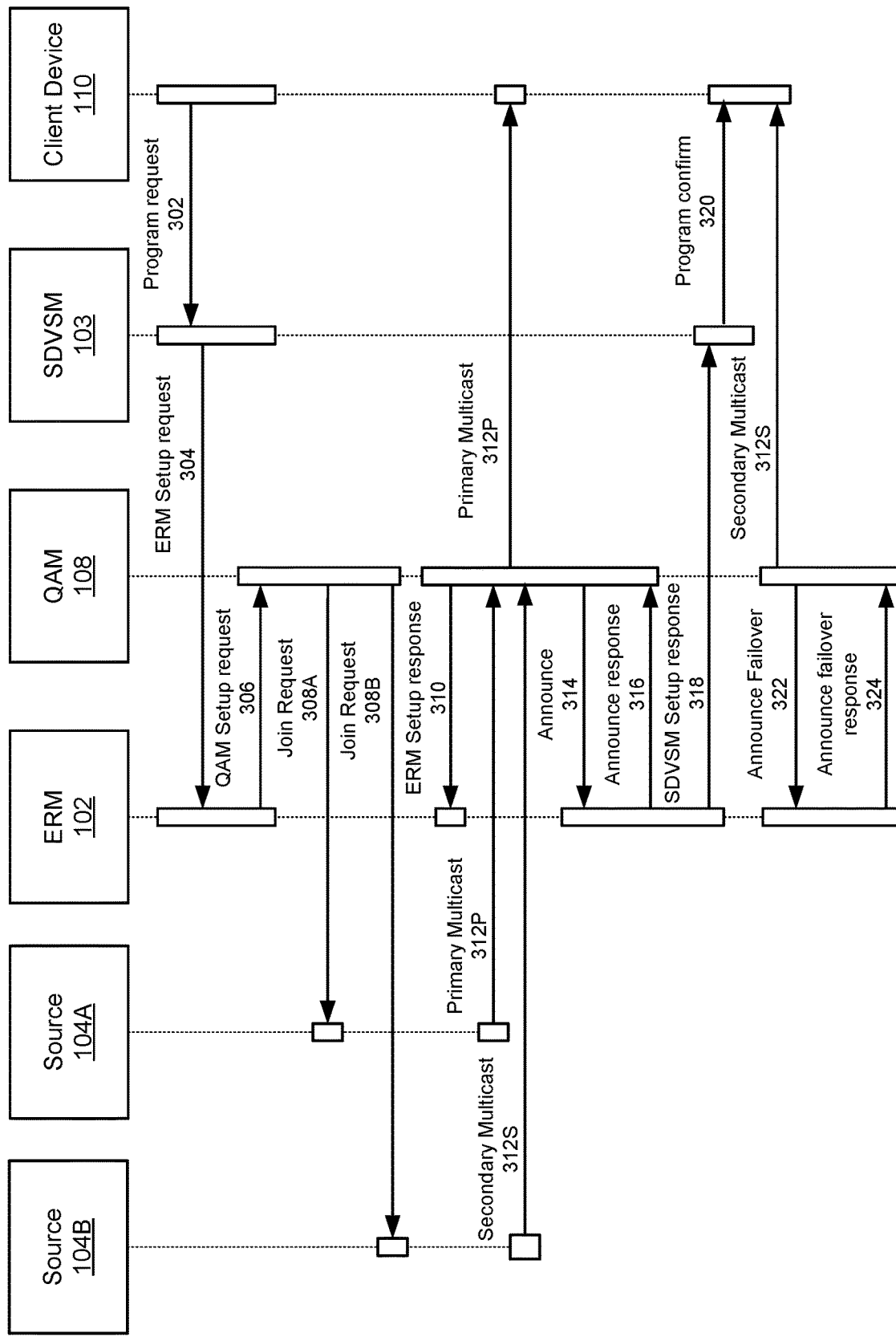

FAILOVER WITH REDUNDANT MULTICASTS FOR SWITCHED DIGITAL VIDEO

CROSS-REFERENCE TO RELATED APPLICATIONS

This application is a continuation of and claims priority to U.S. patent application Ser. No. 16/923,628, filed Jul. 8, 2020, which is a continuation of U.S. patent application Ser. No. 14/809,860, filed Jul. 27, 2015 (now U.S. Pat. No. 10,757,478), which is a continuation of U.S. patent application Ser. No. 12/614,058, filed Nov. 6, 2009 (now U.S. Pat. No. 9,124,523), each of which is hereby incorporated by reference in its entirety.

BACKGROUND

Digital channels can be broadcast to subscribers via a network. The network may communicate the digital channels to node groups, which correspond to a group of subscribers located near one another (e.g., within a neighborhood). In some instances, only a portion of the channels are being simultaneously watched by the subscribers of a single node group, resulting in bandwidth being used to transport unwatched channels.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

According to some aspects, systems and methods may include, responsive to a request by a client device identifying a video program, determining different first and second network paths for delivery of the video program from a content source; delivering the video program via the first network path to the client device; and responsive to a change in status of the video program being delivered via the first network path, delivering the video program via the second network path to the client device.

According to some aspects, systems and methods may include, responsive to a request by a client device identifying a video program, determining different first and second network paths for delivery of the video program from first and second content sources; delivering the video program via the first network path from the first content source to the client device; and responsive to a change in status of the video program being delivered via the first network path, delivering the video program via the second network path from the second content source to the client device.

According to some aspects, systems and methods may include, responsive to a request by a client device identifying a video program, determining a redundant join type based on at least one of the following: whether multiple sources are available that provide the video program, a present balance of traffic on one or more video interface inputs of an edge device, or a subscriber service level; and generating and communicating a program setup request comprising the redundant join type to the edge device.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein:

FIG. 2 is a functional block diagram of an illustrative computer, which may embody any of the functional blocks of FIG. 1;

FIGS. 3A-D are signaling diagrams showing illustrative interactions between functional blocks of FIG. 1.

DETAILED DESCRIPTION

Figure 1:
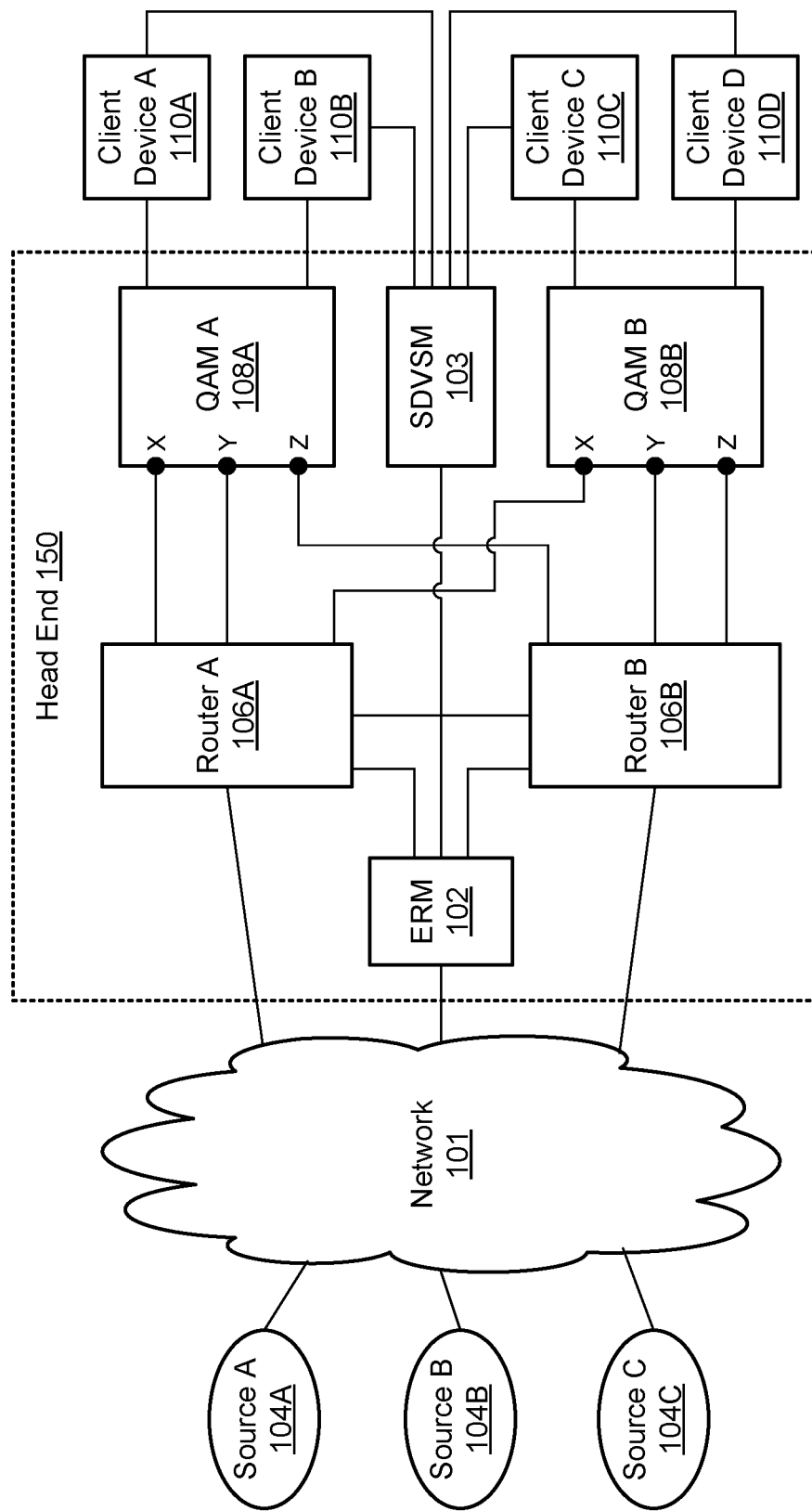
FIG. 1 is a functional block diagram of an illustrative system for providing redundant multicast service to one or more client devices.

FIG. 1 is a functional block diagram of an illustrative system for providing redundant multicast service to one or more client devices. In this example, the system includes one or more content sources 104 (e.g., sources A, B, and C), a network 101, and one or more client devices 110 (e.g., client devices 110A-D). The system as shown also includes a head end 150, which may include, for example, an edge resource manager (ERM) 102 or other type of edge device controller, routers 106A and 106B, one or more edge devices such as quadrature amplitude modulation devices (QAMs) 108A and 108B, and a switched digital video session manager (SDVSM) 103. The system may also include other head ends similar to or different from head end 150, each serving other client devices. The interconnections between the various functional blocks in FIG. 1 may be unidirectional or bidirectional as desired.

The system may act to provide content (e.g., video and/or audio content) from one or more of sources 104 to one or more of client devices 110. In some embodiments, the system may be a television content distribution system or an Internet Protocol television (IPTV) distribution system. Accordingly, the content may include television shows, movies, advertisements, etc. The content may be delivered to client devices 110 via switched video techniques, which is also known as switched digital video (SDV).

In a typical television or IPTV distribution system, content is provided over a plurality of different channels. Using SDV, the physical distribution path between head end 150 and one or more of client devices 110 carries only a subset of available channels based on channel requests by those client devices. For instance, only those channels requested by the client devices at any given time may be carried on the distribution path. While those channels not requested may still be available by the system, those non-requested channels may not be propagated into the distribution path. Because only a subset of the channels are typically requested at any given time, and because only a subset of the client devices will be in use at any given time, SDV may allow more available channels to be provided without necessarily increasing the actual maximum available bandwidth of the distribution path.

Thus, the use of SDV typically means that the network paths through which content is delivered (e.g., multicast video content) dynamically changes depending upon which content the various network clients are requesting at any given time. In contrast, non-SDV systems typically provide static delivery paths for content. Moreover, it is generally desirable to provide for path and/or content redundancy, in the event that there is a point of failure somewhere along a delivery path. While path redundancy may be fairly straightforward in a static path environment, this is less easy to accomplish in a dynamic path environment such as an SDV delivery network. Various techniques for providing such redundancy will be described later in the present disclosure.

Any of the above-mentioned functional blocks, including ERM 102, SDVSM 103, routers 106A-B, QAMs 108A-B, and client devices 110, may each be implemented, for example, as a computer or as a system or device that includes a computer. The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the functional blocks of FIG. 1 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives.

Such a computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 1 and may store computer-executable instructions and/or data used by any of those functional blocks. Alternatively or additionally, such a computer-readable medium storing the data and/or software may be physically separate from, yet accessible by, any of the functional blocks shown in FIG. 1.

Network 101 may be any type of network, and may be a single network or a combination of multiple networks, such as a cable and/or fiber optic and/or satellite television distribution network, a telephone network, and/or the Internet. Physically, network 101 may be embodied, for example, as multiple computers communicatively coupled together as a plurality of nodes in a wired and/or wireless manner.

An example functional block diagram of a computer is shown in FIG. 2, in which the computer is shown to include a processor 201, a communications interface 202, storage 203, and a user interface 204. In this example, the computer-readable medium may be embodied by storage 203, and processor 201 may execute computer-executable instructions stored by storage 203. Communications interface 202 may provide for unidirectional or bidirectional communications with any network or device external to that computer. For example, communications interface 202 as embodied in router 106A may provide communications between network 101 and router 106A, as well as between router 106A and QAMs 108A and B. User interface 204 may allow for unidirectional or bidirectional information transfer between the computer and a human user, such as via a display or a keyboard. Again, any of the functional blocks of FIG. 1 may be implemented as a computer such as shown in FIG. 2.

Figure 3A:
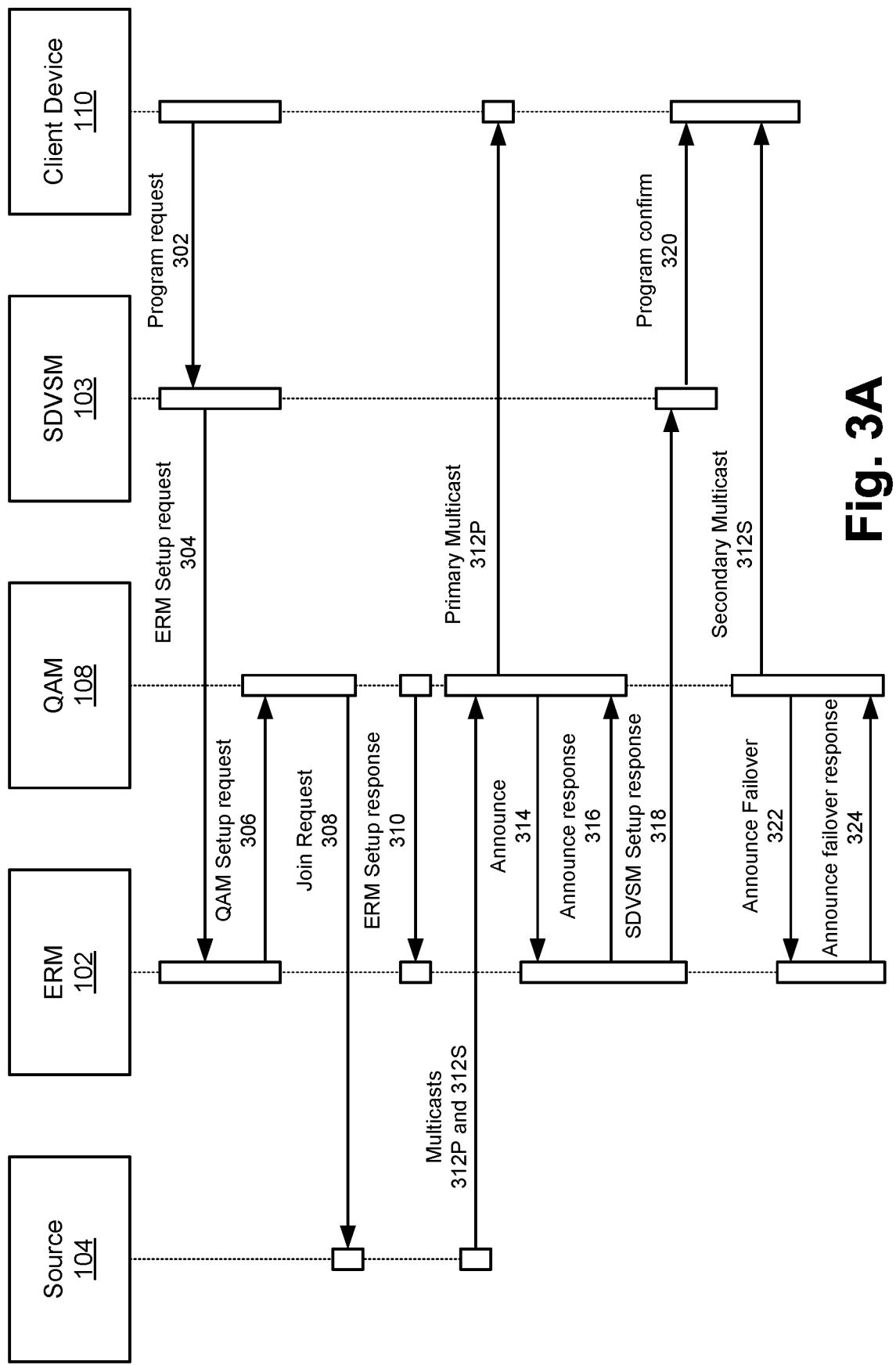
Figure 3B:
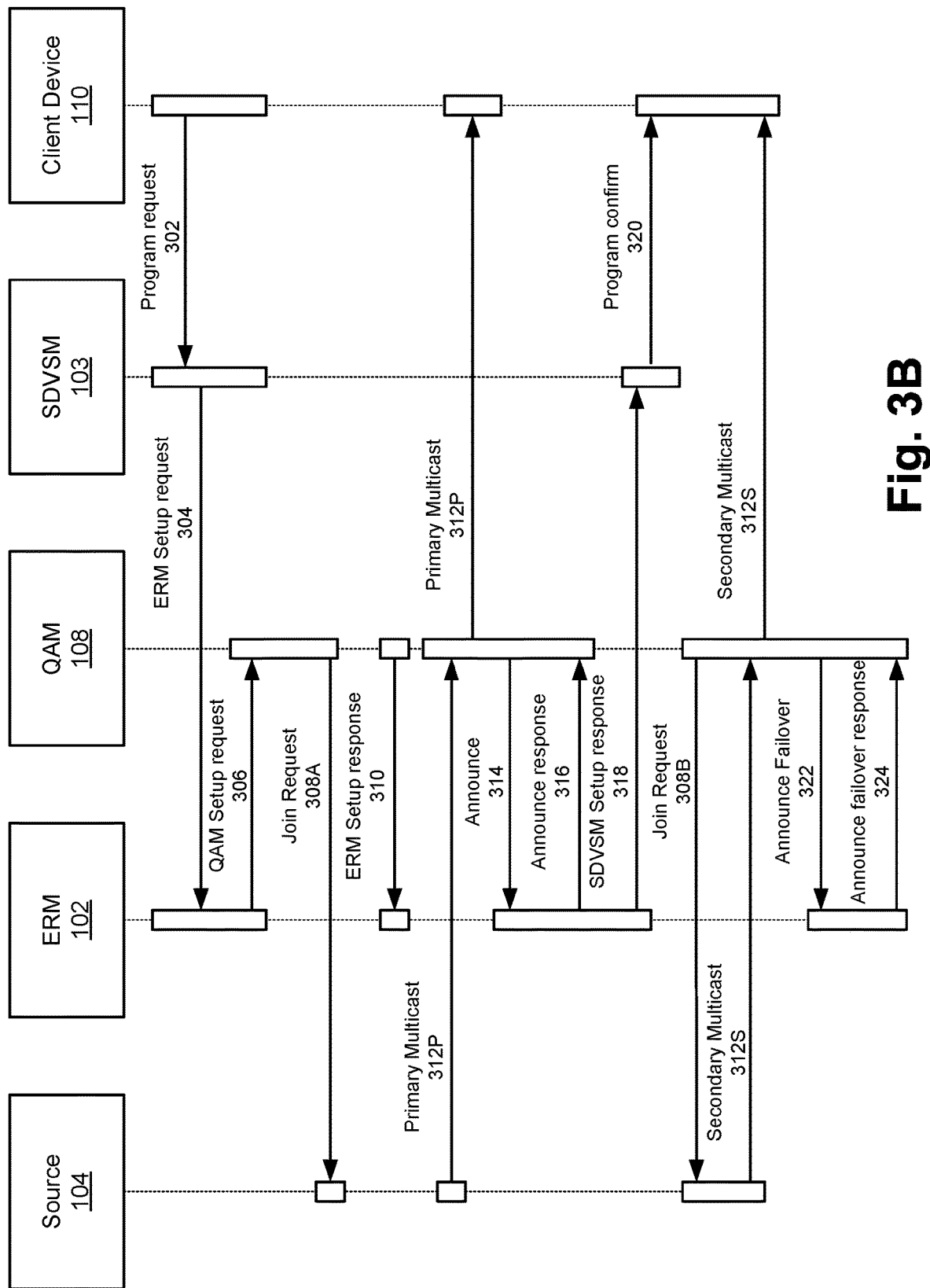
Figure 3D:
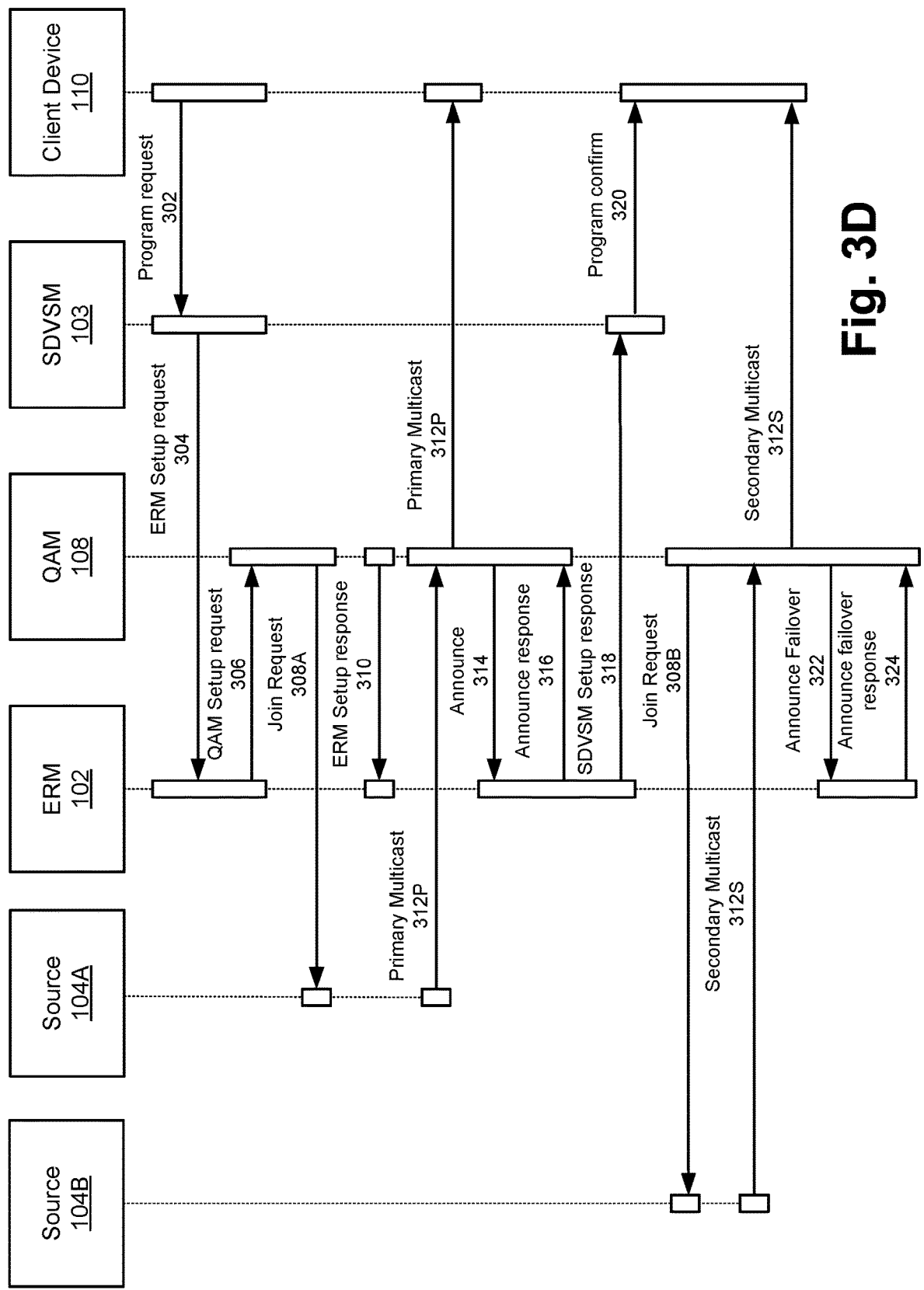
Figure 4:
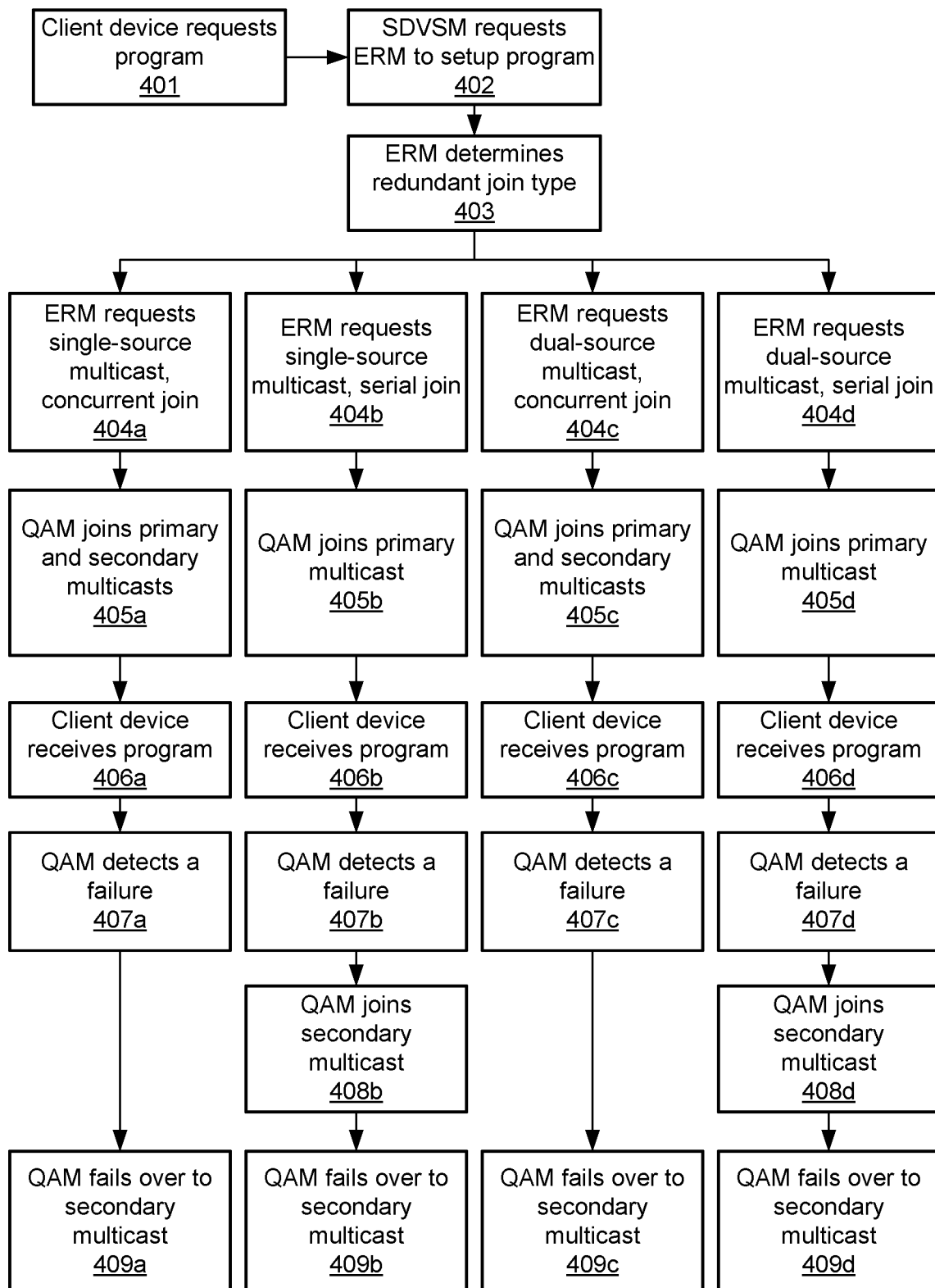
FIG. 4 is a flow chart showing illustrative steps that may be performed by the system of FIG. 1.

FIGS. 3A-D are signaling diagrams showing illustrative interactions between functional blocks of FIG. 1, and FIG. 4 is a flow chart showing illustrative steps that may be performed by the system of FIG. 1.

With reference to FIGS. 1-4, in block 401 (FIG. 4), the flow diagram may include one of the client devices 110 requesting a video program by communicating a program request 302 to SDVSM 103. In FIGS. 3A-D, the program request 302 may include a source identifier (source ID) of the requested source providing the video program of interest. Table I, below, provides information on example sources 104 and the services offered by each. Sources A and B, for instance, both provide the same Entertainment programming but have different source Internet Protocol (IP) addresses.

TABLE I

| Source | Service | Source ID | Multicast Group IP address | Source IP address | Program Number |
|---|---|---|---|---|---|
| A | Entertainment programming | 4163 | 232.96.36.39:4039 | 69.240.57.203 | 1 |
| B | Entertainment programming | 4163 | 232.96.36.39:4039 | 169.240.57.203 | 1 |
| C | News programming | 12153 | 232.96.36.1:4001 | 69.240.57.194 | 1 |

To request a particular program, the client device 110 may, for example, communicate the program request 302 to the SDVSM 103, requesting to tune to source ID 12153 (which identifies a News program from source C). The Source IP address may be a network address of a source 104 providing a multicast transporting the requested program. The Multicast Group IP address may be a destination network address of the group receiving the multicast, and the program number may be a place holder for an MPEG program number.

In block 402, the flow diagram may include the SDVSM 103 processing the program request 302 and communicating an ERM program setup request 304 to the ERM 102. In an example embodiment, the SDVSM 103 may determine whether the requested source ID is already being switched (i.e., not being provided) to another client device 110 of the same head end 150. If not, then the SDVSM 103 sends the ERM program setup request 304 to the ERM 102 including the source ID of the source 104 providing the requested program.

In block 403, the flow diagram may include the ERM 102 processing the ERM program setup request 304 and determining a redundant join type for the requested program. In an example embodiment, the ERM 102 may determine one of four redundant join types: (1) a single-source multicast, concurrent join as described in connection with blocks 404a-409a of FIG. 4 and FIG. 3A; (2) a single-source multicast, serial join as described in connection with blocks 404b-409b of FIG. 4 and FIG. 3B; (3) a dual-source multicast, concurrent join as described in connection with blocks 404c-409c of FIG. 4 and FIG. 3C; or a (4) a dual-source multicast, serial join as described in connection with blocks 404d-409d of FIG. 4 and FIG. 3D.

The ERM 102 may determine the redundant join type based on various factors such as, but not limited to, whether multiple sources are available that provide the same requested program, the present balance of traffic on video interface inputs X, Y, and Z of the QAM 108 and/or in the network 101 and/or the head end 150, and a service level purchased by a subscriber associated with the requesting client device 110.

In a concurrent join, as further described below, the QAM 108 is concurrently joined to, and therefore simultaneously receives, two redundant multicasts carrying the same program. If the QAM 108 fails to receive one of the two multicasts, the QAM 108 can rapidly switch and provide the other multicast, already being received by the QAM 108, to the client device 110 with minimal or no service disruption. In comparison, in a serial join, the QAM 108 is initially joined to, and thus only initially receives, a single multicast carrying a program. If the multicast fails, the QAM 108 may request that a second multicast be provided over a different path and/or from a different source 104. While a serial join can consume less bandwidth than a concurrent join, a larger service disruption may occur in a serial join before the second multicast can be established, as compared with a concurrent join. For this reason, a serial join may correspond to a lower service level than a concurrent join.

Single-Source Multicast, Concurrent Join

Where a single-source multicast, concurrent join is chosen in block 403, the flow diagram may include in step 404a the ERM 102 requesting the QAM 108 to set up a single-source multicast concurrent join. Referring to FIG. 3A, this request is represented by the ERM 102 communicating a QAM program setup request 306 identifying a join type instructing the QAM 108 to set up a single-source multicast, concurrent join.

In response to the setup request 306, the QAM 108 may, in block 405a, join two multicasts that each transport the requested program and that are received via different paths, hereafter referred to respectively as primary and secondary paths. Prior to joining the multicasts in this manner, the QAM 108 may configure two of its video interface inputs (e.g., X and Z) to respectively receive primary and secondary multicasts. The multicast received over the primary path will be referred to herein as a primary multicast 312P, and the multicast received over the secondary path will be referred to herein as a secondary multicast 312S. The primary and secondary paths may be different paths across the system between the source 104 providing the multicast and the QAM 108 receiving the multicast. For example, the multicasts 312P and 312S may pass through different routers 106. In FIG. 1, for instance, source 104A may provide a primary multicast 312P routed through router 106A and received at video interface input X of QAM 108A, and a secondary multicast 312S routed through router 106B and received at video interface input Z of QAM 108A. In another example, the primary and secondary paths may both pass through the same router (e.g., router 106A), but may be forwarded to different video interface inputs (e.g., X and Y) of QAM 108A via different links. While the former example provides less opportunities for a single point of failure, either configuration is possible. As such, the primary and secondary paths may pass through one or more common network elements and links, but the paths taken by those multicasts may differ in at least some way.

To join a multicast, the QAM 108 may communicate a join request 308 to the source 104 via the network 101, identifying a multicast to join that transports the requested program and the video interface inputs configured to receive the primary and secondary multicasts 312P and 312S. The QAM 0108 may also communicate an ERM program setup response 310 to the ERM 102, but may or might not include multicast transport headers for both the primary and secondary multicasts 312P and 312S and the video interface inputs configured to receive the multicasts 312P and 312S. The ERM program setup response 310 may include a frequency and program number used by the client device 110 to tune to the requested program. The ERM 102 also might not respond to the ERM program setup response 310 from the QAM 108 when operating in pessimistic mode until receiving a multicast transporting the requested video. For example, in optimistic session setup, the QAM 108 may return the ERM program setup response 310 to the ERM 102 before it has acquired video even though no video is yet present on its output. In pessimistic session setup, the QAM 108 may not return the session setup response to the ERM 102 until it has acquired video and video is present on its output.

Next, in block 406a, the client device 110 receives the requested program. In an illustrative embodiment, the source 104 may communicate the primary multicast 312P of the requested program to the head end 150 via the network 101. The source 104 may also communicate the secondary multicast 312S of the requested program to the head end 150 via the network 101. For example, to generate the primary and secondary multicasts 312P and 312S, the single source 104 may provide the primary and secondary multicasts 312P and 312S to different network ports on different routers. Also, the primary and secondary multicasts 312P and 312S may be of different quality of video, with one being of higher quality than the other. The multicasts 312P and 312S may traverse different network paths when transmitted via a UDP datagram, which may propagate through the network 101 via multiple paths, and may arrive in a pseudo-random, or even a random order.

The QAM 108 may detect data of the primary multicast 312P on the video interface input configured to receive the primary multicast 312P, and may forward the primary multicast 312P to the client device 110. The QAM 108 may also convert that primary multicast 312P to a radio frequency (RF) video signal and transmit the RF video signal to the client device 110. In response to initially detecting receipt of multicasts 312P and 312S, the QAM 108 may send an announce message 314 to the ERM 102 including a multicast header of each of the primary and secondary multicasts 312P and 312S successfully joined over the primary and secondary paths. In an example, a multicast header may include one or more of a multicast address of the requested program or service, a multicast port of the requested program or service, a multicast program of data within a transport stream (e.g., MPEG-2 stream), a source address from which data of the multicast is streamed, bandwidth (e.g., bits per second), and a destination address of a physical port on which a join request is sent. The ERM 102 may send an announce response 316 to the QAM 108 and respond to the SDVSM 103 with an SDVSM program setup response 318. The SDVSM 103 may communicate a program confirm message 320 in response to receiving the SDVSM program setup response 318. The program confirm message 320 may include a frequency and a program number, which the client device 110 may use to tune to the requested source ID transporting the requested program.

At some point during providing the primary multicast to the requesting client device, the QAM 108 may detect a failure of the primary multicast at block 407a. The failure may be of a link or some network element between the source 104 and the QAM 108 on the primary path, or of the video interface input receiving the primary multicast 312P. To determine that a failure has occurred, the QAM 108 may determine that the primary multicast 312P has not been received for a predetermined amount of time, such as for at least one millisecond, or for at least one second. Thus, a problem with the primary multicast signal that does not occur for at least the predetermined period of time may not be considered to qualify as a failure. A failure may be considered to have occurred not only based on a loss of the primary multicast signal, but alternatively based on a reduction in quality of the received video program carried by the primary multicast signal.

In response to detecting the failure, the QAM 108 may fail over in block 409a to the secondary multicast 312S, and may begin forwarding the already-joined secondary multicast 312S to the requesting client device 110. Because the primary and secondary multicasts 312P and 312S are concurrently joined, the QAM 108 is already receiving the secondary multicast 312S at the time of the failure and can quickly begin providing the secondary multicast 312S to the client device 110 to reduce or eliminate a disruption in service. The QAM 108 may also communicate an announce failover message 322 to the ERM 102 that includes the multicast transport header of the secondary multicast 312S. The ERM 102 may respond with an announce failover response 324.

If the QAM 108 initially detects a failure prior to being capable of forwarding the primary multicast 312P to the client device 110, the QAM 108 may failover to the secondary multicast 312S. In such a scenario, with reference to FIG. 3A, the QAM 108 may not communicate announce message 314 and may not receive announce response 316. Instead, upon detecting the failure, the QAM 108 may forward the secondary multicast 312S to the client device 110, and may communicate the announce failover message 322 to the ERM 102. The ERM 102 may respond with the announce failover response 324 and may communicate the SDVSM program setup response 318 to the SDVSM 103. The SDVSM 103 may then communicate the program confirm message 320 to the client device 110, as discussed above. Further, if there is the single source 104A fails, then the client device 110 may signal loss of the channel to the SDVSM 103, and the SDVSM 103 may instruct the client device 110 to tune to a safe channel.

Single-Source Multicast, Serial Join

Referring again to FIG. 4, in block 403, the ERM may alternatively determine a join type of a single-source multicast, serial join for a requested program and so in block 404b, the ERM 102 may request the QAM 108 to set up a single-source multicast, serial join, which is also described in FIG. 3B. FIG. 3B differs from FIG. 3A as to when the secondary multicast 312S is joined. In FIG. 3A, the QAM 108 attempts to join the secondary multicast 312S when (or shortly after) joining the primary multicast 312P, without waiting for a failure of the primary multicast 312P, and hence the QAM 108 may concurrently receive the primary and secondary multicasts 312P and 312S prior to such a failure. In FIG. 3B, the QAM 108 does not join the secondary multicast 312S until a failure is identified for the primary multicast 312P.

Next, in block 405b, the QAM 108 may join a primary multicast 312P. In an example embodiment, the QAM 108 may configure two of its video interface inputs (e.g., X and Z) to respectively receive the primary and secondary multicasts 312P and 312S via the primary and secondary paths. Once configured, the QAM 108 may communicate a join request 308A to the source 104 via the network 101 to join the primary multicast 312P, but does not yet request to join the secondary multicast 312S. The QAM 108 may also communicate an ERM program setup response 310 to the ERM 102, but may or might not include a multicast transport header for the primary multicast 312P and the video interface inputs configured to receive multicast 312P. The ERM 102 also might not respond to the ERM program setup request 304 from the QAM 108 when operating in pessimistic mode until receiving a multicast transporting the requested video.

Next, in block 406b, the client device 110 may receive the program. In an example embodiment, the source 104 may provide the primary multicast 312P of the requested program to the head end 150 via the network 101. The QAM 108 may detect primary multicast 312P on the video interface input specified in the join request 308, and may forward the primary multicast 312P to the client device 110. In response to initially detecting receipt of multicast 312P, the QAM 108 may send an announce message 314 to the ERM 102 including a multicast header of the primary multicast 312P. The ERM 102 may then send an announce response 316 to the QAM 108 and respond to the SDVSM 103 with an SDVSM program setup response 318. The SDVSM 103 may communicate the program confirm message 320 in response to the SDVSM program setup response 318, as discussed above.

Next, in block 407b, the QAM 108 may detect a failure of the primary multicast, in the same manner as discussed above with regard to block 407a.

In block 408b, in response to detecting the failure, the QAM 108 may join the secondary multicast 312S, and may communicate a second join request 308B to the source 104. The second join request 308B may specify the video interface input (e.g., input Z) previously allocated in block 405b to receive the secondary multicast 312S. The QAM 108 may then receive the secondary multicast 312S from the source 104 over the secondary path.

In block 409b, once joined to the secondary multicast 312S, the QAM 108 may then fail over to the secondary multicast 312S via the secondary path, and may output the secondary multicast 312S to the client device 110. The QAM 108 may also communicate an announce failover message 322 to the ERM 102 that includes the multicast transport header of the secondary multicast 312S. The ERM 102 may send an announce response 316 to the QAM 108 and respond to the SDVSM 103 with an SDVSM program setup response 318.

If the QAM 108 initially detects a failure prior to being capable of forwarding the primary multicast 312P to the client device 110, the QAM 108 may failover to the secondary multicast 312S. In such a scenario, with reference to FIG. 3B, the QAM 108 may not communicate announce message 314 and may not receive announce response 316 from the ERM 102. Instead, upon detecting the failure, the QAM 108 may send join request 308B to the source 104, and may begin receiving the secondary multicast 312S. The QAM 108 may forward the secondary multicast 312S to the client device 110, and may communicate the announce failover message 322 to the ERM 102. The ERM 102 may respond with the announce failover response 324 and may communicate the SDVSM program setup response 318 to the SDVSM 103. The SDVSM 103 may then communicate the program confirm message 320 to the client device 110, as discussed above.

Dual-Source Multicast, Concurrent Join

Referring again to FIG. 4, in block 403, the ERM may alternatively determine a join type of a dual-source multicast, concurrent join for a requested program, and so in block 404c, the ERM 102 may request the dual-source multicast, concurrent join, which is also described in FIG. 3C. FIG. 3C differs from FIGS. 3A-B by including two different sources 104A and 104B providing the primary and secondary multicasts 312P and 312S, respectively, instead of a single source providing both the primary and secondary multicasts 312P, 312S.

In block 405c, in this case the QAM 108 may join primary and secondary multicasts 312P and 312S, respectively, being provided by different sources 104A and 104B. In an example embodiment, the QAM 108 may configure two of its video interface inputs (e.g., X and Z) to respectively receive the multicasts 312P and 312S via the primary and secondary paths. As above, the multicasts 312P and 312S may transport the same program, even though the program is being received from different sources 104A and 104B. Alternatively, the multicasts 312P and 312S may be related to each other, such as one being a national advertising version of a video program and the other being a local advertising version of the same video program. Once the video interface inputs are configured, the QAM 108 may communicate join request 308A to source 104A and join request 308B to source 104B. Each join request 308A and 308B may specify the multicast to join and a video interface input over which to receive the multicast. The QAM 108 may also communicate an ERM program setup response 310 to the ERM 102, but may or might not include multicast transport headers for each of the primary and secondary multicasts 312P and 312S and the video interface inputs configured to receive multicasts 312P and 312S. The ERM 102 also might not respond to the ERM program setup request 304 from the QAM 108 when operating in pessimistic mode until receiving a multicast transporting the requested video.

In block 406c, the client device 110 may receive the video program. In an illustrative embodiment, the source 104A may provide the primary multicast 312P of the requested program to the head end 150 via the network 101. The source 104B may also provide the secondary multicast 312S of the requested program to the head end 150 via the network 101. The QAM 108 may detect the primary multicast 312P on its video interface input specified in the join request 308A, and may forward the primary multicast 312P to the client device 110. In response to initially detecting receipt of multicasts 312P and 312S, the QAM 108 may send an announce message 314 to the ERM 102 including a multicast header for each of the successfully joined multicasts 312P and 312S. The ERM 102 may send an announce response 316 to the QAM 108 and respond to the SDVSM 103 with an SDVSM program setup response 318. The SDVSM 103 may communicate the program confirm message 320 in response to the SDVSM program setup response 318, as discussed above.

In block 407c, the QAM 108 may detect a failure, in a manner as already described above.

In block 409c, in response to detecting a failure, the QAM 108 may fail over to the secondary multicast, and may output the secondary multicast 312S to the client device 110. The QAM 108 may also communicate an announce failover message 322 to the ERM 102 that includes the multicast transport header of the secondary multicast 312S. The ERM 102 may respond with an announce failover response 324.

If the QAM 108 initially detects a failure prior to being capable of forwarding the primary multicast 312P to the client device 110, the QAM 108 may failover to the secondary multicast 312S. In such a scenario, with reference to FIG. 3C, the QAM 108 may not communicate announce message 314 and may not receive announce response 316. Instead, upon detecting the failure, the QAM 108 may forward the secondary multicast 312S to the client device 110, and may communicate the announce failover message 322 to the ERM 102. The ERM 102 may respond with the announce failover response 324 and may communicate the SDVSM program setup response 318 to the SDVSM 103. The SDVSM 103 may then communicate the program confirm message 320 to the client device 110, as discussed above.

Dual-Source Multicast, Serial Join

Referring again to FIG. 4, in block 403, the ERM may determine a join type of a dual-source multicast, serial join for a requested program, and so in block 404d, the ERM 102 may request QAM 108 set up the dual-source multicast, serial join, which is also described in FIG. 3D. In FIG. 3D, the ERM 102 may, for example, communicate a QAM program setup request 306 identifying a join type instructing the QAM 108 to set up a dual-source multicast, serial join.

In block 405d, the QAM 108 may join a primary multicast 312P via a primary path. In an example embodiment, the QAM 108 may configure two of its video interface inputs (e.g., X and Z) to respectively receive the multicast via the primary and secondary paths. Once configured, the QAM 108 may communicate a join request 308A to the source 104A via the network 101 specifying the multicast to join and a video interface input (e.g., input X). The QAM 0108 may also communicate an ERM program setup response 310 to the ERM 102, but may or might not include a multicast transport header for the primary multicast 312P and the video interface input configured to receive the multicast 312P. The ERM 102 also might not respond to the ERM program setup request 304 from the QAM 108 when in pessimistic mode until receiving a multicast transporting the requested video.

In block 406d, the client device 110 may receive the program. In an example embodiment, the source 104 may provide the primary multicast 312P of the requested program to the head end 150 via the network 101. The QAM 108 may detect data of the primary multicast 312P on the video interface input specified in the join request 308A, and may forward the primary multicast 312P to the client device 110.

In response to initially detecting receipt of multicast 312P, the QAM 108 may send an announce message 314 to the ERM 102 including a multicast header of primary multicast 312P. The ERM 102 may also send an announce response 316 to the QAM 108 and respond to the SDVSM 103 with an SDVSM program setup response 318. The SDVSM 103 may communicate the program confirm message 320 in response to the SDVSM program setup response 318, as discussed above.

In block 407d, the QAM 108 may detect a failure, in a manner as already discussed above.

In block 408d, and in response to detecting the failure, the QAM 108 may join the secondary multicast 312S, and may communicate a second join request 308B to the source 104B. The second join request 308B may specify the video interface input (e.g., input Z) previously allocated in block 405d to receive the secondary multicast 312S. The QAM 108 may then receive the secondary multicast 312S from source 104B.

In block 409d, the QAM 108 may fail over to the secondary multicast, and may output the secondary multicast 312S to the client device 110. The QAM 108 may also communicate an announce failover message 322 to the ERM 102 that includes the multicast transport header of the secondary multicast 312S. The ERM 102 may respond with an announce failover response 324.

If the QAM 108 initially detects a failure prior to being capable of forwarding the primary multicast 312P to the client device 110, the QAM 108 may failover to the secondary multicast 312S. In such a scenario, with reference to FIG. 3D, the QAM 108 may not communicate announce message 314 and may not receive announce response 316. Instead, upon detecting the failure, the QAM 108 may send join request 308B to the source 104B, and may begin receiving the secondary multicast 312S. The QAM 108 may forward the secondary multicast 312S to the client device 110, and may communicate the announce failover message 322 to the ERM 102. The ERM 102 may respond with the announce failover response 324 and may communicate the SDVSM program setup response 318 to the SDVSM 103. The SDVSM 103 may communicate the program confirm message 320 to the client device 110, as discussed above.

One or more aspects of the above examples may be embodied in computer-executable instructions, such as in one or more program modules, executed by one or more computers or other devices such as by any of the blocks in FIG. 1. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. An apparatus comprising:
one or more processors; and
memory storing instructions that, when executed by the one or more processors, cause the apparatus to:
receive, from a plurality of user devices, requests for content items, wherein the plurality of user devices are associated with different service levels that comprise:
a first service level in which a requested content item is received via a plurality of physical network paths; and
a second service level in which a requested content item is received via a single physical network path;
determine, for each of the requests and based on a corresponding service level for each of the requests, a quantity of physical network paths for receiving a corresponding requested content item;
receive, for each of the requests and via a corresponding quantity of physical network paths, a corresponding requested content item,
wherein based on determining that a first request, for a first content item, corresponds to the first service level, a portion of the first content item is received via a first physical network path of the plurality of physical network paths while the portion of the first content item is received via a second physical network path of the plurality of physical network paths; and
send the requested content items to corresponding requesting user devices.

2. The apparatus of claim 1, wherein the instructions, when executed by the one or more processors, cause the apparatus to:
based on determining that a second request, for a second content item, corresponds to the second service level, receive a portion of the second content item via the first physical network path, of the plurality of physical network paths, without receiving the portion of the second content item via the second physical network path of the plurality of physical network paths.

3. The apparatus of claim 1, wherein the instructions, when executed by the one or more processors, cause the apparatus to:
for the first service level, respond to a failure along the first physical network path of the plurality of physical network paths by sending a portion of a requested content item that was received, before the failure occurred, via the second physical network path of the plurality of physical network paths.

4. The apparatus of claim 1, wherein the instructions, when executed by the one or more processors, cause the apparatus to:
for the second service level, respond to a failure along the first physical network path of the plurality of physical network paths by using the second physical network path of the plurality of physical network paths.

5. The apparatus of claim 4, wherein the failure comprises one or more of the following:
a failure to receive a portion of a requested content item via the first physical network path, or
a reduction in quality of a portion of the requested content item received via the first physical network path.

6. The apparatus of claim 1, wherein the instructions, when executed by the one or more processors, cause the apparatus to:

configure a first video interface input to receive a first requested content item via the first physical network path of the plurality of physical network paths, and configure a second video interface input to receive the first requested content item via the second physical network path of the plurality of physical network paths.

7. The apparatus of claim 1, wherein the apparatus comprises a quadrature amplitude modulation (QAM) device.

8. The apparatus of claim 1, wherein the plurality of physical network paths correspond to a plurality of different multicasts.

9. A non-transitory computer-readable medium storing instructions that, when executed, cause:

receiving, from a plurality of user devices, requests for content items, wherein the plurality of user devices are associated with different service levels that comprise:
a first service level in which a requested content item is received via a plurality of physical network paths; and
a second service level in which a requested content item is received via a single physical network path;

determining, for each of the requests and based on a corresponding service level for each of the requests, a quantity of physical network paths for receiving a corresponding requested content item;

receiving, for each of the requests and via a corresponding quantity of physical network paths, a corresponding requested content item, wherein based on determining that a first request, for a first content item, corresponds to the first service level, a portion of the first content item is received via a first physical network path of the plurality of physical network paths while the portion of the first content item is received via a second physical network path of the plurality of physical network paths; and sending the requested content items to corresponding requesting user devices.

10. The non-transitory computer-readable medium of claim 9, wherein the instructions, when executed, further cause:

based on determining that a second request, for a second content item, corresponds to the second service level, receiving a portion of the second content item via the first physical network path, of the plurality of physical network paths, without receiving the portion of the second content item via the second physical network path of the plurality of physical network paths.

11. The non-transitory computer-readable medium of claim 9, wherein the instructions, when executed, further cause:

for the first service level, responding to a failure along the first physical network path of the plurality of physical network paths by sending a portion of a requested content item that was received, before the failure occurred, via the second physical network path of the plurality of physical network paths.

12. The non-transitory computer-readable medium of claim 9, wherein the instructions, when executed, further cause:

for the second service level, responding to a failure along the first physical network path of the plurality of physical network paths by using the second physical network path of the plurality of physical network paths.

13. The non-transitory computer-readable medium of claim 12, wherein the failure comprises one or more of the following:

a failure to receive a portion of a requested content item via the first physical network path, or a reduction in quality of a portion of the requested content item received via the first physical network path.

14. The non-transitory computer-readable medium of claim 9, wherein the instructions, when executed, further cause:

configuring a first video interface input to receive a first requested content item via the first physical network path of the plurality of physical network paths, and configuring a second video interface input to receive the first requested content item via the second physical network path of the plurality of physical network paths.

15. The non-transitory computer-readable medium of claim 9, wherein the plurality of physical network paths correspond to a plurality of different multicasts.

16. A system comprising:
a first computing device; and
a first user device of a plurality of user devices,
wherein the first computing device comprises:
one or more first processors; and
first memory storing first instructions that, when executed by the one or more first processors, cause the first computing device to:
receive, from the plurality of user devices, requests for content items, wherein the plurality of user devices are associated with different service levels that comprise:
a first service level in which a requested content item is received via a plurality of physical network paths; and
a second service level in which a requested content item is received via a single physical network path;
determine, for each of the requests and based on a corresponding service level for each of the requests, a quantity of physical network paths for receiving a corresponding requested content item;
receive, for each of the requests and via a corresponding quantity of physical network paths, a corresponding requested content item,
wherein based on determining that a first request, for a first content item, corresponds to the first service level, a portion of the first content item is received via a first physical network path of the plurality of physical network paths while the portion of the first content item is received via a second physical network path of the plurality of physical network paths; and
send the requested content items to corresponding requesting user devices, and
wherein the first user device comprises:
one or more second processors; and
second memory storing second instructions that, when executed by the one or more second processors, cause the first user device to:
send the first request for the first content item.

17. The system of claim 16, wherein the first instructions, when executed by the one or more first processors, cause the first computing device to:

based on determining that a second request, for a second content item, corresponds to the second service level, receive a portion of the second content item via the first physical network path, of the plurality of physical network paths, without receiving the portion of the second content item via the second physical network path of the plurality of physical network paths.

18. The system of claim 16, wherein the first instructions, when executed by the one or more first processors, cause the first computing device to:
for the first service level, respond to a failure along the first physical network path of the plurality of physical network paths by sending a portion of a requested content item that was received, before the failure occurred, via the second physical network path of the plurality of physical network paths.

19. The system of claim 16, wherein the first instructions, when executed by the one or more first processors, cause the first computing device to:
for the second service level, respond to a failure along the first physical network path of the plurality of physical network paths by using the second physical network path of the plurality of physical network paths.

20. The system of claim 19, wherein the failure comprises one or more of the following:
a failure to receive a portion of a requested content item via the first physical network path, or
a reduction in quality of a portion of the requested content item received via the first physical network path.

21. The system of claim 16, wherein the first instructions, when executed by the one or more first processors, cause the first computing device to:
configure a first video interface input to receive a first requested content item via the first physical network path of the plurality of physical network paths, and
configure a second video interface input to receive the first requested content item via the second physical network path of the plurality of physical network paths.

22. The system of claim 16, wherein the first computing device comprises a quadrature amplitude modulation (QAM) device.

23. The system of claim 16, wherein the plurality of physical network paths correspond to a plurality of different multicasts.

24. An apparatus comprising:
one or more processors; and
memory storing instructions that, when executed by the one or more processors, cause the apparatus to:
determine a plurality of different service levels, wherein the service levels correspond to using different quantities of physical network paths for receiving content items;
receive, from a user device, a request for a requested content item;
receive, from one or more content sources and using a corresponding quantity of physical network paths selected based on a service level, of the plurality of different service levels, associated with the user device, the requested content item, wherein a portion of the requested content item is received via a second physical network path while receiving the portion of the requested content item via a first physical network path; and
send the requested content item to the user device.

25. The apparatus of claim 24, wherein the instructions, when executed by the one or more processors, cause the apparatus to:
receive, from the one or more content sources, a portion of an additional requested content item via the first physical network path without receiving the portion of the additional requested content item via the second physical network path.

26. The apparatus of claim 24, wherein the instructions, when executed by the one or more processors, cause the apparatus to:
for one of the plurality of different service levels, respond to a failure along the first physical network path by using the second physical network path.

27. The apparatus of claim 26, wherein the failure comprises one or more of the following:
a failure to receive a portion of the requested content item via the first physical network path, or
a reduction in quality of a portion of the requested content item received via the first physical network path.

28. The apparatus of claim 24, wherein different physical network paths correspond to different multicasts.

29. A non-transitory computer-readable medium storing instructions that, when executed, cause:
determining a plurality of different service levels, wherein the service levels correspond to using different quantities of physical network paths for receiving content items;
receiving, from a user device, a request for a requested content item;
receiving, from one or more content sources and using a corresponding quantity of physical network paths selected based on a service level, of the plurality of different service levels, associated with the user device, the requested content item, wherein the receiving the requested content item comprises receiving a portion of the requested content item via a second physical network path while receiving the portion of the requested content item via a first physical network path; and
sending the requested content item to the user device.

30. The non-transitory computer-readable medium of claim 29, wherein the instructions, when executed, further cause:
receiving, from the one or more content sources, a portion of an additional requested content item via the first physical network path without receiving the portion of the additional requested content item via the second physical network path.

31. The non-transitory computer-readable medium of claim 29, wherein the instructions, when executed, further cause:
for one of the plurality of different service levels, responding to a failure along the first physical network path by using the second physical network path.

32. The non-transitory computer-readable medium of claim 31, wherein the failure comprises one or more of the following:
a failure to receive a portion of the requested content item via the first physical network path, or
a reduction in quality of a portion of the requested content item received via the first physical network path.

33. The non-transitory computer-readable medium of claim 29, wherein different physical network paths correspond to different multicasts.

34. A system comprising:
a first computing device; and
a first user device,
wherein the first computing device comprises:
one or more first processors; and
first memory storing first instructions that, when executed by the one or more first processors, cause the first computing device to:

determine a plurality of different service levels, wherein the service levels correspond to using different quantities of physical network paths for receiving content items;

receive, from the first user device, a request for a requested content item;

receive, from one or more content sources and using a corresponding quantity of physical network paths selected based on a service level, of the plurality of different service levels, associated with the first user device, the requested content item, wherein a portion of the requested content item is received via a second physical network path while receiving the portion of the requested content item via a first physical network path; and send the requested content item to the first user device, and wherein the first user device comprises:
one or more second processors; and
second memory storing second instructions that, when executed by the one or more second processors, cause the first user device to:
send the request for the requested content item.

35. The system of claim 34, wherein the first instructions, when executed by the one or more first processors, cause the first computing device to:

receive, from the one or more content sources, a portion of an additional requested content item via the first physical network path without receiving the portion of the additional requested content item via the second physical network path.

36. The system of claim 34, wherein the first instructions, when executed by the one or more first processors, cause the first computing device to:

for one of the plurality of different service levels, respond to a failure along the first physical network path by using the second physical network path.

37. The system of claim 36, wherein the failure comprises one or more of the following:

a failure to receive a portion of the requested content item via the first physical network path, or a reduction in quality of a portion of the requested content item received via the first physical network path.

38. The system of claim 34, wherein different physical network paths correspond to different multicasts.

39. An apparatus comprising:
one or more processors; and
memory storing instructions that, when executed by the one or more processors, cause the apparatus to:
receive, from a plurality of user devices, requests for content items;
determine, for each of the requests, a different quantity of connections for receiving a corresponding requested content item;
receive, for each of the requests and via a corresponding quantity of connections, a corresponding requested content item, wherein
a portion of a first content item, of the content items, is received via a first connection while receiving the portion via a second connection; and
send the requested content items to corresponding requesting user devices.

40. The apparatus of claim 39, wherein the instructions, when executed by the one or more processors, cause the apparatus to:

receive a portion of a second content item, of the content items, via the first connection, without receiving the portion of the second content item via another connection.

41. The apparatus of claim 39, wherein the instructions, when executed by the one or more processors, cause the apparatus to:

respond to a failure along the first connection by sending a portion of the first content item, of the content items, that was received, before the failure occurs, via the second connection.

42. The apparatus of claim 39, wherein the instructions, when executed by the one or more processors, cause the apparatus to:

respond to a failure along the first connection by using the second connection.

43. A non-transitory computer-readable medium storing instructions that, when executed, cause:

receiving, by a computing device and from a plurality of user devices, requests for content items;

determining, for each of the requests, a different quantity of connections for receiving a corresponding requested content item;

receiving, for each of the requests and via a corresponding quantity of connections, a corresponding requested content item, wherein a portion of a first content item, of the content items, is received via a first connection while receiving the portion via a second connection; and sending the requested content items to corresponding requesting user devices.

44. The non-transitory computer-readable medium of claim 43, wherein the instructions, when executed, further cause:

receiving a portion of a second content item, of the content items, via the first connection, without receiving the portion of the second content item via another connection.

45. The non-transitory computer-readable medium of claim 43, wherein the instructions, when executed, further cause:

responding to a failure along the first connection by sending a portion of the first content item, of the content items, that was received, before the failure occurs, via the second connection.

46. The non-transitory computer-readable medium of claim 43, wherein the instructions, when executed, further cause:

responding to a failure along the first connection by using the second connection.

47. A system comprising:
a first computing device; and
a first user device of a plurality of user devices,
wherein the first computing device comprises:
one or more first processors; and
first memory storing first instructions that, when executed by the one or more first processors, cause the first computing device to:
receive, from the plurality of user devices, requests for content items;
determine, for each of the requests, a different quantity of connections for receiving a corresponding requested content item;
receive, for each of the requests and via a corresponding quantity of connections, a corresponding requested content item, wherein a portion of a first content item, of the content items, is received via a first connection while receiving the portion via a second connection; and send the requested content items to corresponding requesting user devices, and wherein the first user device comprises:

one or more second processors; and second memory storing second instructions that, when executed by the one or more second processors, cause the first user device to:

send one of the requests for content items.

48. The system of claim 47, wherein the first instructions, when executed by the one or more first processors, cause the first computing device to:

receive a portion of a second content item, of the content items, via the first connection, without receiving the portion of the second content item via another connection.

49. The system of claim 47, wherein the first instructions, when executed by the one or more first processors, cause the first computing device to:

respond to a failure along the first connection by sending a portion of the first content item, of the content items, that was received, before the failure occurs, via the second connection.

50. The system of claim 47, wherein the first instructions, when executed by the one or more first processors, cause the first computing device to:

respond to a failure along the first connection by using the second connection.

\* \* \* \* \*

UNITED STATES PATENT AND TRADEMARK OFFICE
CERTIFICATE OF CORRECTION

PATENT NO. : 11,729,467 B2
APPLICATION NO. : 17/882010
DATED : August 15, 2023
INVENTOR(S) : Mao et al.

It is certified that error appears in the above-identified patent and that said Letters Patent is hereby corrected as shown below:

On the Title Page

Column 2, Other Publications, Line 4:
Delete "Cognerence" and insert --Conference-- therefor In the Specification Column 6, Detailed Description, Line 25:
Delete "0108" and insert --108-- therefor Column 10, Detailed Description, Line 52:
Delete "0108" and insert --108-- therefor Signed and Sealed this
Twenty-second Day of October, 2024

Katherine Kelly Vidal
*Director of the United States Patent and Trademark Office*